United States Patent [19]

Twietmeyer

[11] Patent Number: 4,823,403
[45] Date of Patent: Apr. 18, 1989

[54] SYSTEM FOR OPTICALLY TRANSMITTING DATA BETWEEN CIRCUIT PACKS, SUCH AS PRINTED CIRCUIT BOARDS

[75] Inventor: Ted H. Twietmeyer, Holcomb, N.Y.

[73] Assignee: Switch Tech, Inc., East Bloomfield, N.Y.

[21] Appl. No.: 30,358

[22] Filed: Mar. 26, 1987

[51] Int. Cl.$^4$ .............................................. H04B 9/00
[52] U.S. Cl. .................................. 455/607; 455/617; 455/612; 370/4; 350/96.16
[58] Field of Search ............... 455/601, 612, 613, 606, 455/607, 600, 617, 620; 370/1, 3, 4; 350/96.1, 96.11, 96.16

[56] References Cited

U.S. PATENT DOCUMENTS

| | | | |
|---|---|---|---|
| 3,777,154 | 12/1973 | Lindsey | 250/227 |
| 4,063,083 | 12/1977 | Cathey et al. | 455/607 |
| 4,182,544 | 1/1980 | McMahon | 350/96.16 |
| 4,257,124 | 3/1981 | Porter et al. | 455/601 |
| 4,393,515 | 7/1983 | de Neumann | 455/606 |
| 4,470,154 | 9/1984 | Yano | 455/607 |
| 4,494,185 | 1/1985 | Gunderson et al. | 364/200 |
| 4,516,272 | 5/1985 | Yano | 455/607 |
| 4,527,285 | 7/1985 | Kekas et al. | 455/607 |
| 4,543,666 | 9/1985 | Witte et al. | 455/612 |
| 4,573,215 | 2/1986 | Oates et al. | 455/607 |
| 4,608,682 | 8/1986 | Nagashima et al. | 370/4 |
| 4,690,490 | 9/1987 | Mori | 350/96.1 |

OTHER PUBLICATIONS

Mayo; "Materials for Information and Communications," *Scientific American;* Oct. 1986; pp. 59-65.

*Primary Examiner*—Robert L. Griffin
*Assistant Examiner*—Andrew J. Telesz, Jr.
*Attorney, Agent, or Firm*—Stonebraker, Shepard & Stephens

[57] ABSTRACT

An optical data transmission system includes an optical stack 10 of internally reflective chambers 20, each having ports 21 in which light emitters 15 and detectors 16 are arranged. These are mounted on the edges 13 of circuit packs 11 and 12 arrayed around optical stack 10 so that data can flow between the circuit packs by means of light pulses from emitters 15 irradiating the chambers and being detected by detectors 16. A processor controls which of the circuit packs transmit and which of the circuit packs receive so that the optical data transmission is not only fast but readily varied.

21 Claims, 6 Drawing Sheets

SYSTEM FOR OPTICALLY TRANSMITTING DATA BETWEEN CIRCUIT PACKS, SUCH AS PRINTED CIRCUIT BOARDS

BACKGROUND

Data flow between circuit packs (also called circuit cards or circuit boards) is often a bottleneck. In many systems, circuit packs are interconnected via a back plane whose conductors necessarily limit the speed of data flow. Fiber optical interconnections between circuit packs are generally limited by being serial, rather than parallel, because of the difficulties presented by a mass of fiber optic cables and their precision end terminations.

To speed up the flow of data between circuit packs, I have devised an optical system that is fast and versatile without requiring troublesome fiber optic cables and their precision end terminations. My system aims at high speed, low cost, simple interconnections, and programmability of the data flow between circuit packs. My system is also shock and vibration resistant, inexpensive to service and maintain, and compatible with present and foreseeable technology. In fact, my optical transmission system can transmit data faster than present day electronic components on circuit packs can supply the data to be transmitted.

SUMMARY OF THE INVENTION

My optical data transmitting system arranges a number of circuit packs around an optical stack or column of internally reflective chambers. Each of the chambers has a number of ports that can accept light emitters and light detectors mounted on edges of the circuit packs so that light pulses can irradiate the chambers and be detected for transmitting data. The ports are preferably arranged in vertical rows along the optical stack, which serves as a hub from which circuit packs with light emitters and light detectors registered with the ports can extend outward like spokes. Several light emitters can then irradiate each of the internally reflective chambers of the optical stack, and several light detectors can detect a radiation pulse within any one of the chambers. A high speed microprocessor controls the circuit packs, designating the light emitters that are to produce a radiation pulse and the light detectors that are to detect any pulse. The chambers can then serve as parallel optical paths so that a multi-bit data word can be transmitted simultaneously with a clock pulse by means of presence or absence of a light pulse in each of a succession of chambers in the stack. The microprocessor can readily rearrange the data flow paths to determine which circuit packs transmit and which circuit packs receive. One chamber of the stack can be dedicated to a clock pulse, and another to an acknowledgement pulse that a data word has been received. An indefinite number of chambers can be arranged in a single optical stack, and two or more optical stacks can work in cooperation with each other. The speed of transmission through the optical stack is faster than the fastest components now available on circuit packs; and as circuit pack components become faster, my optical stack promises to keep up, even as circuit pack components become photonic, rather than electronic.

DRAWINGS

DETAILED DESCRIPTION

Figure 1:
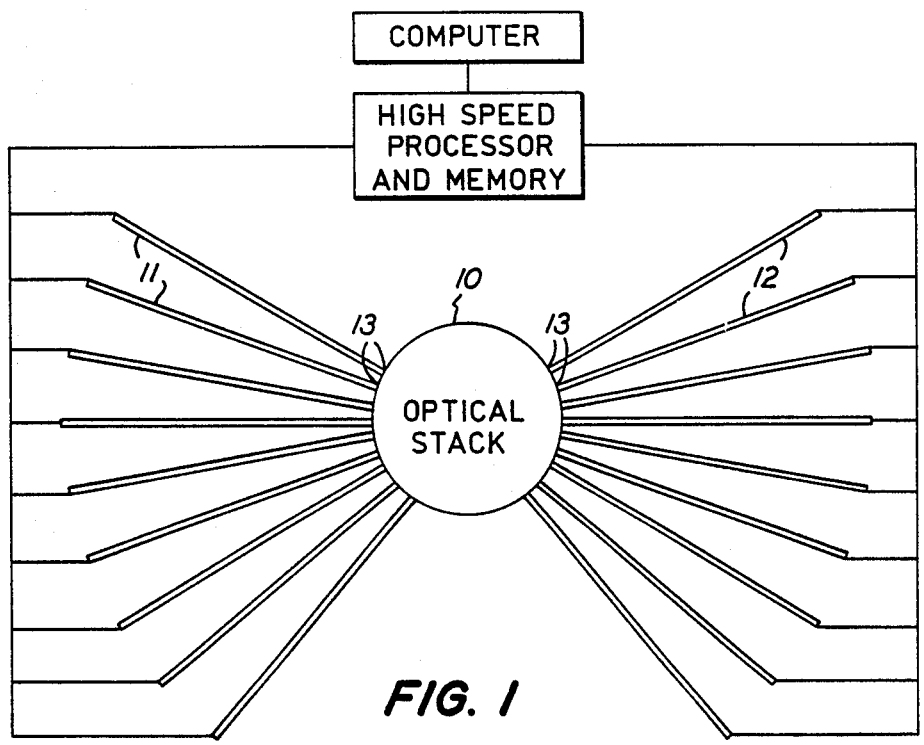
FIG. 1 is a partially schematic plan view of a preferred embodiment of my optical data transmitting system.

At the heart of my optical data transmission system is an optical column or stack 10 with internally reflective chambers 20. A pulse or wink of light irradiating the interior of one of the chambers 20 reflects from interior chamber walls and is detected by a chosen one of an array of detectors viewing the chamber. By this means, data from one circuit pack can be transmitted to another circuit pack at the speed of light, simultaneously through a plurality of chambers 20.

I prefer that optical stack 10 be arranged vertically as illustrated and that circuit packs 11 and 12 be arranged radially around optical stack 10 in vertical planes that intersect the vertical axis of optical stack 10. This fans out circuit packs 11 and 12 around optical stack 10 and allows cooling air to rise effectively between the circuit packs. It also brings the inner edges 13 of the circuit packs close together at the periphery of the optical stack. Light emitters, such as laser diodes 15, are arranged along the inner edges 13 of circuit packs 11 that are capable of transmitting data, and light detectors, such as photo diodes 16, are arranged along the inner edges 13 of circuit packs 12 that are capable of receiving data. Light emitters 15 and detectors 16 are arrayed around the periphery of chambers 20 so that light from any emitter 15 irradiating any particular chamber 20 can be detected by any detector 16 arranged to view that particular chamber 20.

To accommodate emitters 15 and detectors 16, each of the chambers 20 has a plurality of ports 21 formed as holes through peripheral wall 22. Each of the ports 21 is sized to receive emitters 15 and detectors 16, and ports 21 are preferably arranged in rows so that the inner edge 13 of a circuit pack can lie adjacent a row of ports 21 and hold an array of emitters 15, detectors 16, or a mixture of emitters and detectors, each registered with a port 21.

Figure 2:
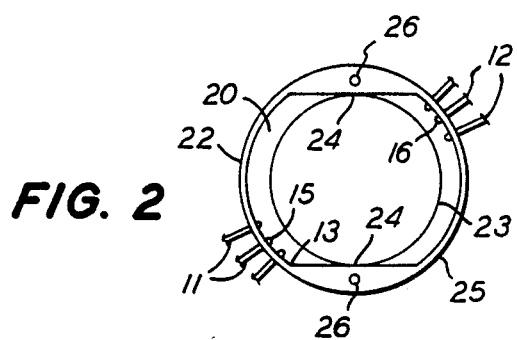
FIG. 2 is a fragmentary view of the optical stack of FIG. 1 with a top cover removed.
Figure 3:
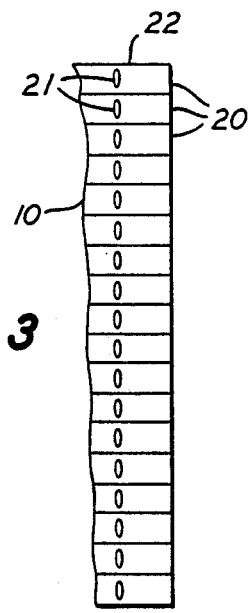
FIG. 3 is a fragmentary elevational view of the optical stack of FIG. 1, showing a vertical row of ports into internally reflective chambers.
Figure 4:
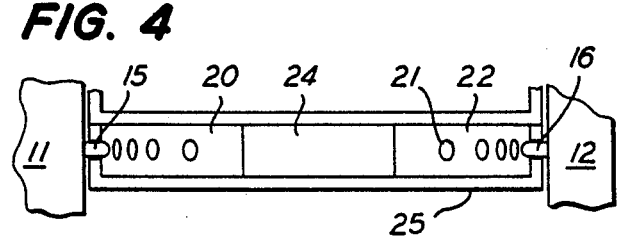
FIG. 4 is a fragmentary horizontal cross-sectional view of one chamber of the optical stack of FIG. 1.
Figure 5A:
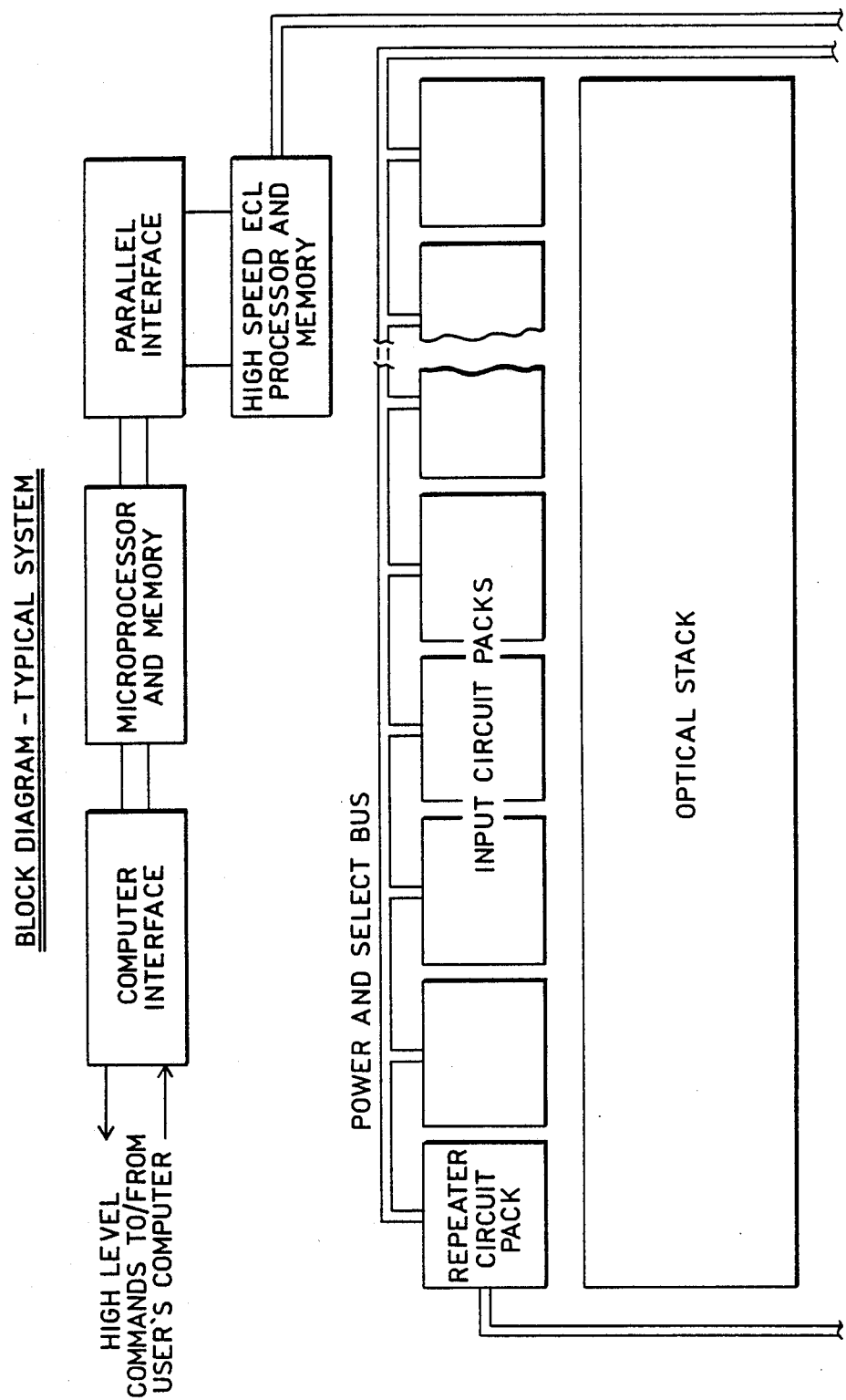
FIGS. 5A and 5B are a block diagram of one preferred way of operating my optical data transmission system.
Figure 5B:
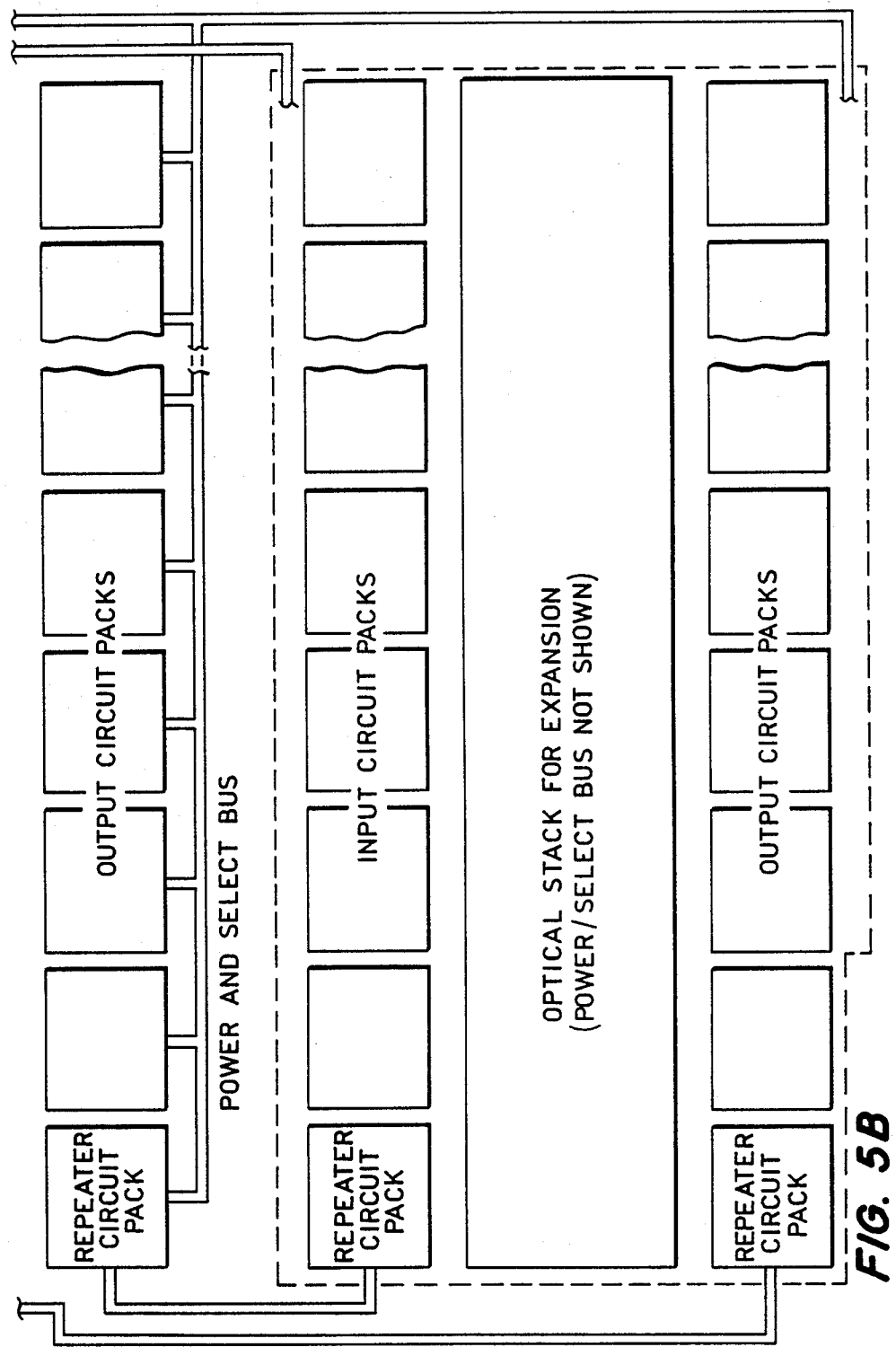
Figure 6:
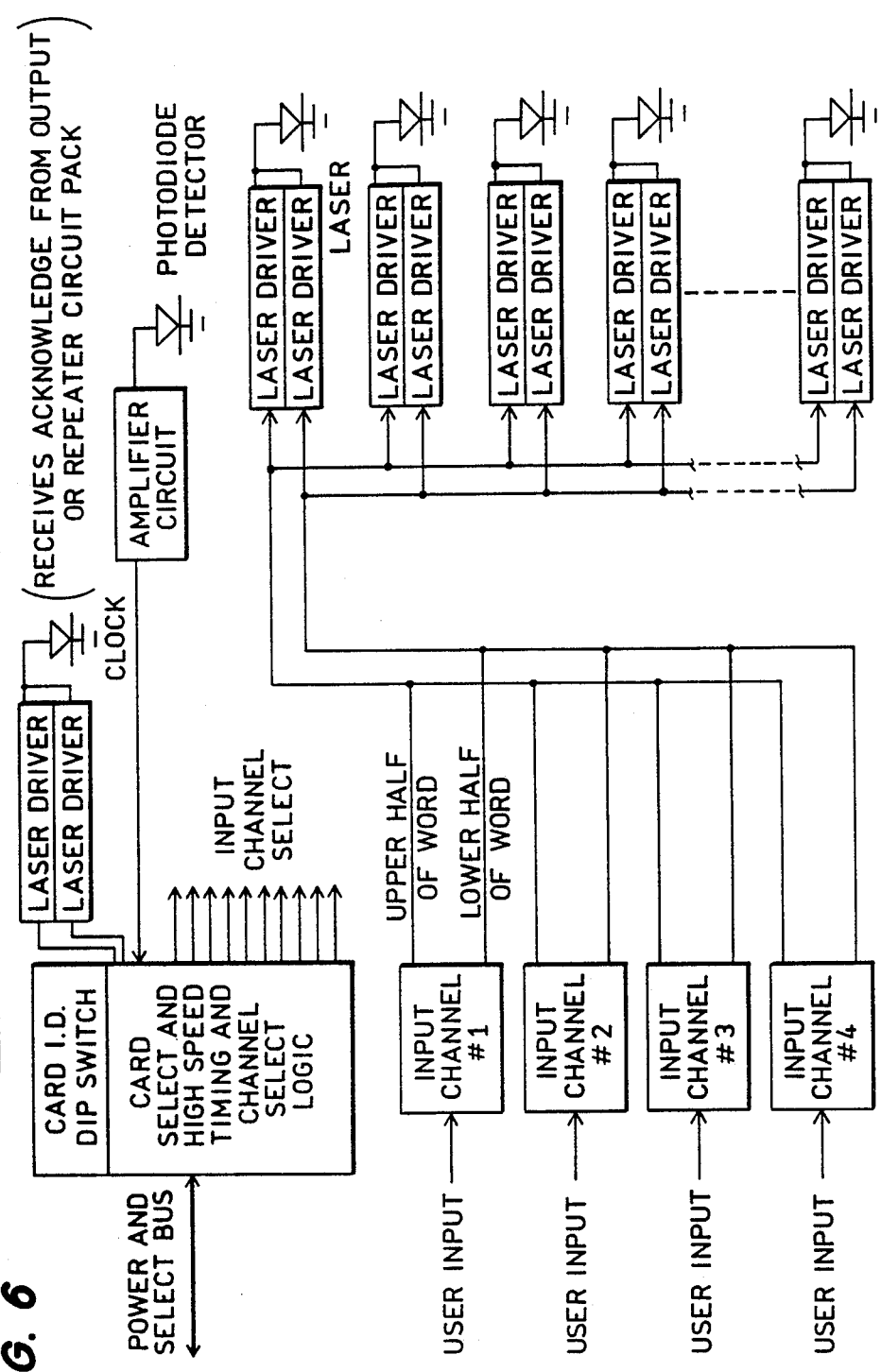
FIG. 6 is a block diagram of a preferred input circuit pack for my optical data transmission system.
Figure 7:
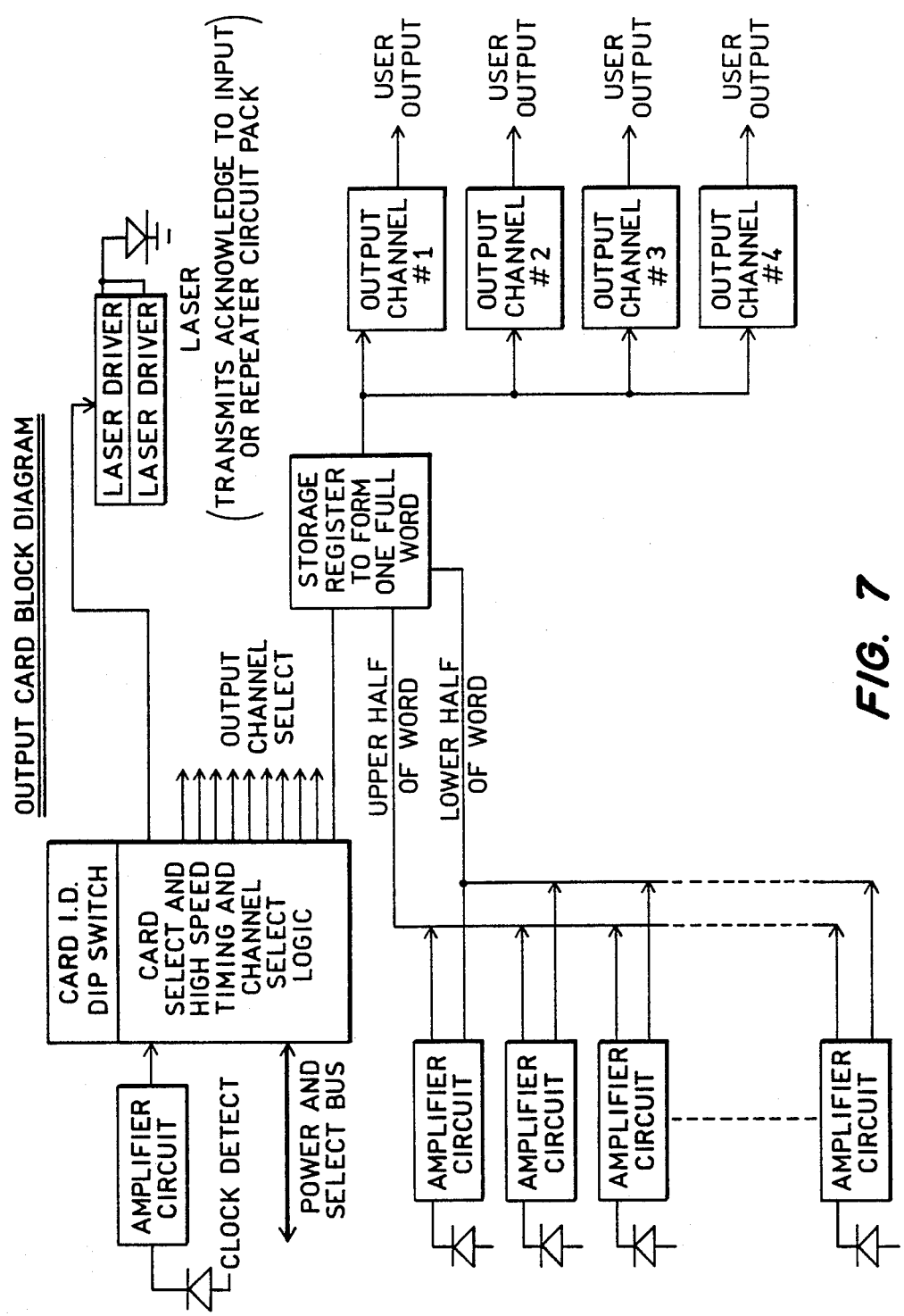
FIG. 7 is a block diagram of a preferred output circuit pack for my optical data transmission system.
Figure 8:
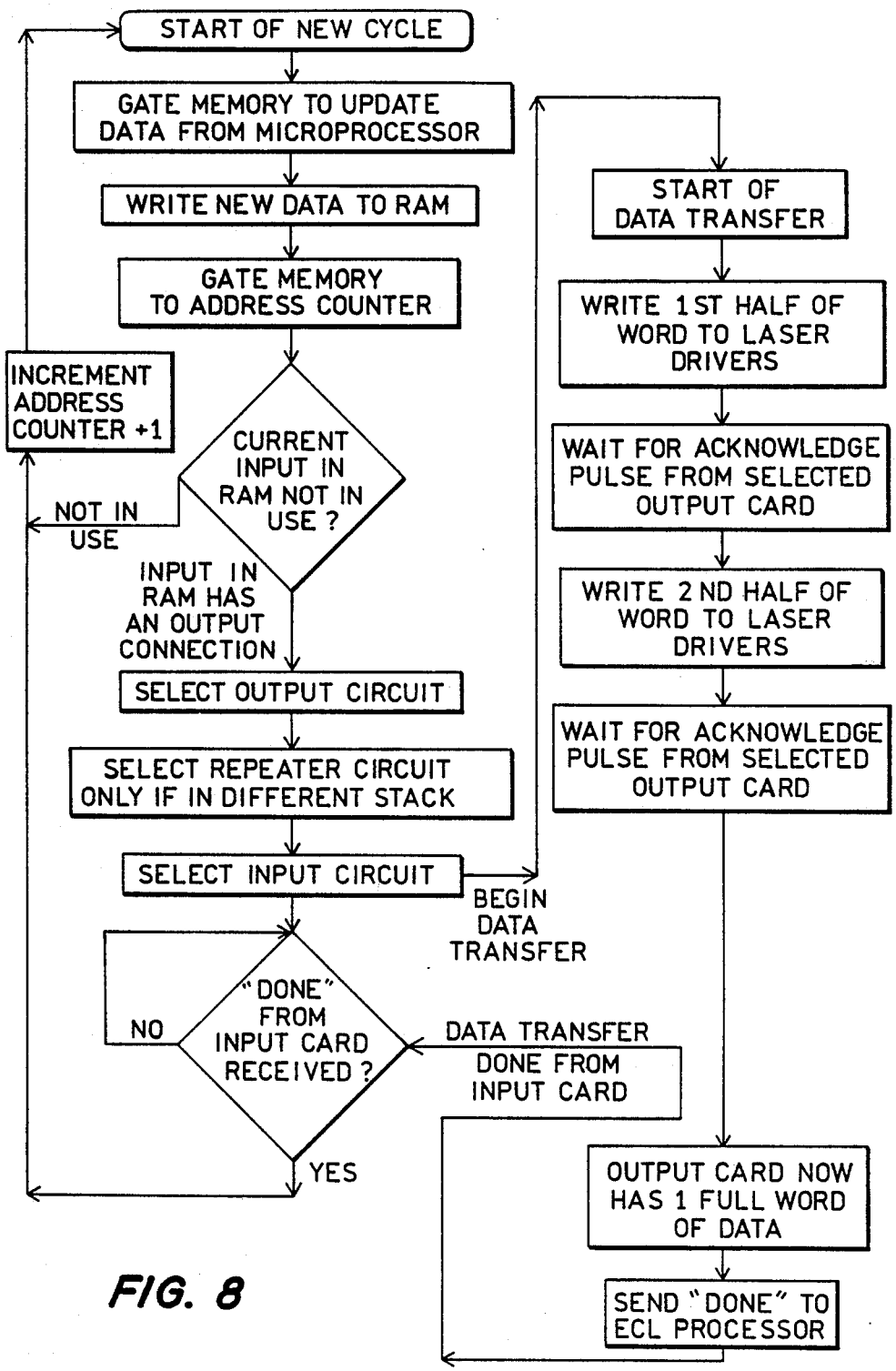
FIG. 8 is a flow chart for a high speed ECL processor preferred for operating my optical data transmission system.

One preferred way of making optical stack 10 with internally reflective chambers 20 is by stacking cylindrical, cup-shaped elements 25, as shown in FIG. 4, on a pair of stacking dowels 26, shown in FIG. 2. Elements 25 can be molded of resin material and can have reflective surfaces formed by foil or vacuum deposited reflective material. The concave side of each element 25 forms one interior chamber 20, and the convex side of a superposed element 25 closes the top of the underlying chamber. There are many other ways that chambers 20 can be made, including parallel and spaced reflective elements inserted into a cylinder to divide the cylinder into a plurality of adjacent chambers 20.

For elements 25, as shown in FIGS. 2 and 4, I have found data transmission to be more reliable if internally reflective surfaces of each chamber 20 are spaced a few millimeters away from emitters 15 and detectors 16. This is best shown by the reflective surface boundary 23 in FIG. 2, which is used on both the upper and lower parallel surfaces of each element 25. I also make straight vertical walls 24 reflective so that light pulses can reflect off walls 24 on their way to detectors. I have found that an optical stack 7 to 10 centimeters in diameter can accommodate 10 input circuit packs and 10 output circuit packs and can be stacked 18 chambers high and still fit within cabinetry standards for electronic equipment. My work shows that chamber dimensions can vary considerably and still operate effectively. Pulses of infrared light from present day laser diodes, for example, can adequately irradiate a range of sizes of optical chambers from which an array of detectors 16 can reliably receive each radiation pulse. I have also found that more than one optical stack can work cooperatively together to increase the amount and speed of data transmission and to accommodate a greater number of circuit packs.

There are many ways of controlling and operating my optical stack, depending on many variables including the nature of the data being transmitted. My optical transmission system can replace relay switching systems that are now used to connect an array of inputs to an array of outputs; and besides greater speed, my optical system has an advantage over relay systems in being immune to vibration, shock, and gravity. My optical data transmission system can also be used in computers, telephone switching systems, multiplexers, and many other environments.

One preferred arrangement for operating my optical data transmission system is shown in the block and flow diagrams of FIGS. 5–8, which are largely self-explanatory. For faster transmission to take advantage of the speed of the optical stack, a data word of, for example, 16 bits can be divided into two 8-bit halves that are transmitted in rapid succession. To accomplish this, two cascade-type laser driver circuits power each laser diode to produce two quickly consecutive radiation pulses as required for transmitting each half of the data word. The high speed processor and memory rapidly selects which of the circuit packs are to transmit and which are to receive so that the data flow path can be varied rapidly. Under present technology, I prefer an emitter coupled logic (ECL) system to give the controlling processor adequate speed, but other, and more expensive possibilities also exist. Each transmission occurs simultaneously with a clock pulse radiated into one of the chambers 20 and is followed by an acknowledgement pulse radiated back to the transmitting circuit pack 11 from the receiving circuit pack 12. When both halves of the data word are transmitted, the accomplishment of this is signaled to the controlling processor, which then prepares for the next transmission. With current technology, only a few nanoseconds are required to transmit each data word.

As electronics and photonics evolve, circuit packs will change, as will controlling processors and other components involved in operating my optical data transmission system. My optical stack is fast enough to accommodate the highest expectable speeds from such components.

I claim:

1. An optical system for transmitting data between circuit packs such as printed circuit boards, said system comprising:
   a. a plurality of chambers having reflective interiors, said chambers being arranged in a stack;
   b. each of said chambers having a plurality of ports communicating with said reflective interiors and adapted for accepting light emitters and light detectors;
   c. a plurality of said circuit packs arranged so that edges of said circuit packs extend along said chambers so that each of said circuit pack edges are disposed adjacent one of said ports in each of said chambers; and
   d. said light emitters and light detectors being arranged on said edges of said circuit packs so that each one of said light emitters extends into one of said ports to be aimed into a single one of said chambers, and each one of said detectors is arranged in a single one of said ports to detect light in a single one of said chambers, and so that each of said reflective chambers can receive light pulses from at least one of said light emitters and said light pulses in each of said reflective chambers can be detected by at least one of said detectors.

2. The system of claim 1 wherein said ports for said light emitters are generally opposite said ports for said detectors.

3. The system of claim 1 wherein said chambers are identical in shape and are formed within stacked elements.

4. The system of claim 1 wherein said chambers are stacked on a vertical axis, and said circuit packs are arranged radially in planes intersecting said vertical axis.

5. The system of claim 1 wherein said light emitters are laser diodes.

6. The system of claim 1 wherein internally reflective surfaces of said chamber interiors are spaced from said ports.

7. The system of claim 1 wherein each of a plurality of said chambers is illuminatable by more than one of said light emitters, and light within said plurality of said chambers is detectable by more than one of said detectors.

8. An optical system for transmitting data between circuit packs such as printed circuit boards, said system comprising:
   a. an optical column divided into adjacent chambers, each of which has internally reflective surfaces and generally opposed ports adapted for accepting light emitters and light detectors;
   b. a plurality of said circuit packs arranged around said optical column, said circuit packs having said light emitters and light detectors mounted on edges of said circuit packs so that said light emitters and said light detectors register with said ports; and
   c. each one of said light emitters being aimed into a single one of said chambers, and each one of said detectors being arranged to detect light in a single one of said chambers, and each of said chambers being illuminated by at least one of said light emitters, and light in each of said chambers being detected by at least one of said detectors.

9. The system of claim 8 wherein said column is formed by stacking a plurality of identical elements forming boundaries between said chambers.

10. The system of claim 9 wherein said column is vertical and said circuit packs are arranged radially in vertical planes around said column.

11. The system of claim 8 wherein said internally reflective surfaces of said chambers are spaced from said ports.

12. The system of claim 8 wherein a plurality of said chambers are illuminatable by more than one of said light emitters, and light within said plurality of said chambers is detectable by more than one of said detectors.

13. A method of optically transmitting data between circuit packs such as printed circuit boards, said method comprising:
   a. arranging a plurality of said circuit packs around an optical column divided into internally reflecting optical chambers having ports for light emitters and light detectors;
   b. providing preselected ones of said circuit packs with light emitters that can respectively irradiate said chambers, each of said light emitters being arranged for irradiating a single one of said chambers;
   c. providing preselected ones of said circuit packs with light detectors that can respectively detect radiation in said chambers, each of said light detectors detecting radiation in a single one of said chambers; and
   d. controlling said circuit packs with a processor that determines at each data transmission interval which of said light emitters irradiates which of said chambers and which of said light detectors detects radiation within which of said chambers.

14. The method of claim 13 wherein one of said circuit packs operates one of said light emitters in one of said chambers to provide a clock pulse for each of said data transmission intervals, and said light detectors of a plurality of said circuit packs detect said clock pulse.

15. The method of claim 13 wherein a receiving one of said circuit packs having a plurality of said light detectors respectively viewing a plurality of said chambers operates one of said light emitters in one of said chambers to produce a light pulse acknowledging reception of a data transmission.

16. The method of claim 13 wherein a plurality of said circuit packs have both said light emitters and said light detectors.

17. An optical data transmission column comprising:
   a. said optical column being divided into adjacent chambers each having light-reflecting internal surfaces and generally opposed ports for receiving light emitters and light detectors;
   b. a plurality of circuit packs such as printed circuit boards arranged around said column so that an edge of each circuit pack aligns with a row of said ports and each of said edges has one of either said light emitters or said detectors registered respectively with each of said ports, each of said circuit packs having only one of said light emitters or said detectors registered with any one of said ports and aimed into any one of said chambers; and
   c. a processor that controls, at each transmission interval, which of said emitters transmits a light pulse into which respective one of said chambers and which of said detectors detects light pulses within which respective one of said chambers for transmitting data between said circuit packs via said optical column.

18. The column of claim 17 wherein one of said light emitters of one of said circuit packs produces a clock pulse in one of said chambers for each of said transmission intervals.

19. The column of claim 17 wherein light reflecting internal surfaces within said chambers are spaced from said ports.

20. The column of claim 17 wherein a plurality of said circuit packs have both said light emitters and said light detectors.

21. The column of claim 17 wherein a plurality of said light emitters are arranged for transmitting said light pulses respectively into a corresponding plurality of said chambers, and a plurality of said light detectors are arranged for detecting said light pulses respectively in a corresponding plurality of said chambers.

* * * * *